Nov. 13, 1951     D. A. WIELAND     2,574,677
MULTIPLE PART SET SCREW
Filed Jan. 7, 1948
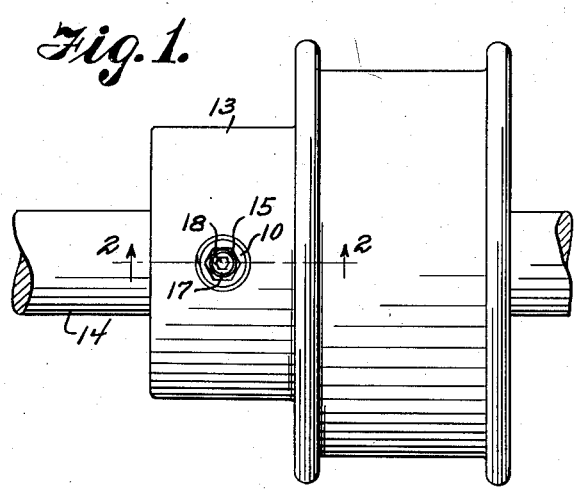
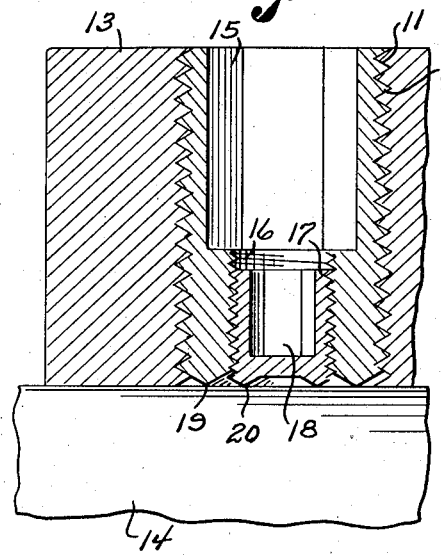
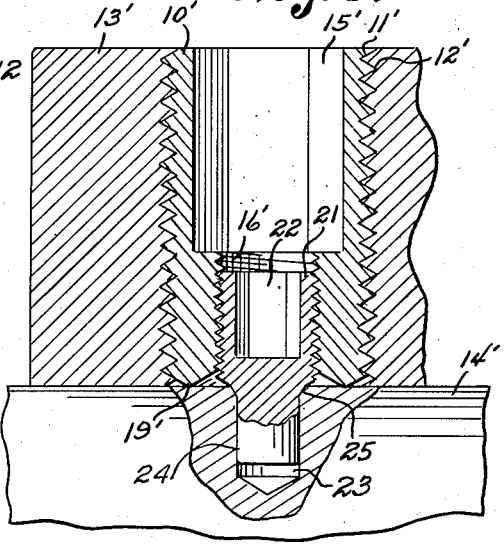
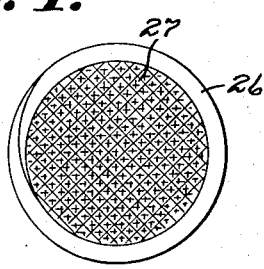
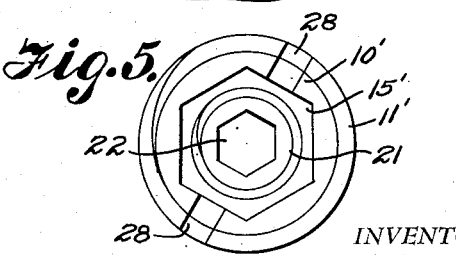
INVENTOR.
Daniel A. Wieland
BY Victor J. Evans & Co.
ATTORNEYS Patented Nov. 13, 1951

2,574,677

UNITED STATES PATENT OFFICE 2,574,677

MULTIPLE PART SET SCREW

Daniel A. Wieland, Hagerstown, Md.

Application January 7, 1948, Serial No. 981

4 Claims. (Cl. 85—1)

1

This invention relates to improvements in multiple part set screws, and more particularly to a two piece set screw.

An object of the invention is to provide a two piece set screw, having a large outer threaded body provided with an internal threaded bore that is adapted to receive a small set screw body therein, whereby both the outer body and the inner screw are provided with locking action in their combined operation.

With the above and other objects and advantages in view, the invention is hereinafter more fully described, claimed and illustrated in the accompanying drawing in which:

Figure 1 is an elevational view of an assembly utilizing an embodiment of the invention;

Figure 2 is a vertical, sectional view on the line 2—2 of Figure 1;

Figure 3 is a vertical, sectional view of a modified form of the invention;

Figure 4 is a bottom plan view of a modified form of the inner screw of Figure 2, showing the flat end of the set screw with a knurled or roughened surface;

Figure 5 is a top plan view of a modified form of assembly.

Referring more in detail to the drawings, and more especially to Figures 1 and 2, the set screw assembly embodying the invention is seen to comprise an outer set screw body 10 which is provided with the external screw threads 11. The set screw body 10, by means of the threads 11, is threaded into the tapped bore 12 of a part 13, which it is desired to retain in fixed relation to a part 14. The set screw body 10 is provided with a centrally located hex-shaped bore 15 in which is placed a similarly shaped wrench whereby the set screw body 10 is threaded into the bore 12.

Centrally of the bore 15, the set screw body 10 is provided with a tapped bore 16 that is adapted to receive the externally threaded inner set screw 17. The set screw 17 is provided centrally thereof with a hex-shaped bore 18 which is adapted to receive a similarly shaped wrench which is of smaller dimensions than the wrench used to tighten the set screw body 10.

The lower end of the set screw body 10 about the bore 16 is provided with the conventional cup point, the lower edge 19 of which cup is adapted to engage the part 14. The lower end of the set screw 17 is also provided with the conventional cup point, the edge of which at 20 is adapted to engage the part 14.

In the use of this set screw assembly, the set screw body 10 is turned until it bottoms against the part 14. It is then turned slightly back to clear the part 14. The set screw 17 is then installed in the bore 16 and drawn into tight engagement with the part 14. The set screw body 10 is then tightened to further force the set screw 17 into the part 14 and lock the assembly in engagement with the part 14.

To remove the set screw, the body 10 is first loosened to break its locking effect, and the set screw 17 is then backed out. It will be noted that the threads of the bore 16 and the threads of the set screw 17 are of a finer pitch than the threads 11 of the set screw body 10. Thus a locking effect is achieved.

In the modified form shown in Figure 3, the set screw body 10' is identical in all respects to the set screw body 10 of Figure 2. Set screw body 10' has the external threads 11' receivable in the tapped bore 12' of the part 13' placed on the part 14', as previously described. The set screw body 10' has the central hex-shaped bore 15' to receive a wrench for the tightening thereof.

Centrally of the bore 15' the set screw body 10' is provided with a tapped bore 16' which is adapted to receive the externally threaded pin type set screw 21. The set screw 21 is provided centrally thereof with a hex-shaped bore 22, which is also adapted to receive a wrench.

In this assembly, the part 14' is provided with a drilled opening 23 which is adapted to receive the pin end 24 of the set screw 21. The pin end 24 is shaped so as to make convenient entrance into the opening 23. The lower end of the set screw body 10' about the bore 16' is provided with the conventional cup point, the lower edge 19' of which is adapted to engage the part 14'.

In Figure 3, it will be noted that the set screw 21, about the pin 24, at its upper end, is provided with a tapered shoulder 25. Thus the set screw 21 will draw tight into the opening 23, permitting a generous tolerance as regards the accuracy of the opening 23. It will also be seen that when the final turn of the set screw body 10' is made, the tapered shoulder will be forced further into the opening 23, producing a very tight fit on the shear line of the parts 13' and 14'.

The use of the modified form of the invention is similar in all respects to the use of the first form described.

The use of the latter set screw combination for a pin application provides great advantages over the conventional straight or tapered pin application. No special machining accuracy is required, such as reaming for the pin, just a straight opening of reasonable accuracy is needed to permit efficient operation of the combination.

The size of the assembly is determined by the strength required by the connection or the torque strength needed.

No mutilation of parts occurs in the installation or removal of the set screw assembly, and a tight fit is provided at all times. The threads of the two parts are of different pitch and different helix angles, thus the parts, when used in combination, as explained, provide a locking action similar to the effect of a lock nut.

In the modified form of set screw 26 shown in Figure 4, the conventional cup point with its edge 20 on the bottom of the set screw 17, as shown in Figure 1, has been changed to show a flat knurled or roughened surface 27 which is used to form a gripping contact with the part 14.

In the modified form shown in Figure 5, the assembly is as previously described for all its various elements, except that the set screw body is provided, on its upper edge, with the opposed alined slots 28, which are adapted to receive a spanner wrench which would be used in the event the set screw is of a length as to make it impossible to use the standard inside hexagon-shaped wrench.

There has thus been provided a set screw assembly which, it is believed, will efficiently perform the tasks for which it has been designed.

It is believed that from the foregoing description, the structure and operation of the invention will be apparent to those skilled in the art, and it is to be understood that changes in the minor details of construction, arrangement and combination of parts may be resorted to, providing they fall within the spirit of the invention and the scope of the appended claims.

Having thus described the invention, what is claimed as new or desired to be secured by Letters Patent is:

1. A set screw assembly comprising an outer body portion provided with external threads, a hex-shaped bore centrally of said body portion, an internally threaded bore at the bottom of said hex-shaped bore, a set screw threaded into the internally threaded bore, the set screw having a hex-shaped bore which is in axial alinement with the hex-shaped bore of the outer body portion and the threads of the bore of the outer body and the threads of the set screw being of finer pitch than the external threads of the set screw body, a pin end on the lower end of the set screw having a tapered surface forming a gripping surface thereon and the lower end of the set screw body is provided with a gripping surface.

2. A set screw assembly comprising an outer body portion provided with external threads, a hex-shaped bore centrally of said body portion, an internally threaded bore at the bottom of said hex-shaped bore concentric with said hex-shaped bore, a set screw threaded into the internally threaded bore, the length of the threaded portion of the set screw and the length of the internally threaded bore being of a length less than the length of the outer body portion, the set screw having a hex-shaped bore which is in axial alinement with the hex-shaped bore of the outer body portion and the threads of the bore of the outer body portion and the threads of the set screw being of finer pitch than the external threads of the outer body portion, the lower end portion of the set screw and the lower end portion of the outer body portion each having a tapered surface thereon to provide a gripping surface.

3. A set screw assembly as in claim 2 wherein the set screw and the outer body portion each have a second tapered surface reversely tapered to said first tapered surface to provide a biting edge on said set screw and outer body portion.

4. A set screw assembly as in claim 2 wherein said set screw is provided with a locking pin merging with and extending below the tapered surface thereof.

DANIEL A. WIELAND.

REFERENCES CITED

The following references are of record in the file of this patent:

UNITED STATES PATENTS

| Number | Name | Date |
|---|---|---|
| 679,927 | Warman | Aug. 6, 1901 |
| 866,184 | Brison | Sept. 17, 1907 |
| 869,086 | Hoffman | Oct. 22, 1907 |
| 2,197,875 | Odin | Apr. 23, 1940 |
| 2,201,087 | Hallowell | May 14, 1940 |
| 2,314,274 | Hallowell | Mar. 16, 1943 |